(12) United States Patent (10) Patent No.: US 9,225,706 B2
Hoggan (45) Date of Patent: *Dec. 29, 2015

(54) MULTIPLE ACCESS POINT ZERO SIGN-ON (71) Applicant: Cable Television Laboratories, Inc., Louisville, CO (US)

(72) Inventor: Stuart A. Hoggan, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/143,122

(22) Filed: Dec. 30, 2013

(65) Prior Publication Data

US 2014/0115684 A1 Apr. 24, 2014

Related U.S. Application Data (63) Continuation of application No. 13/423,359, filed on Mar. 19, 2012, now Pat. No. 8,621,590.

(51) Int. Cl.
*G06F 7/04* (2006.01)
*H04L 29/06* (2006.01)
*H04W 12/06* (2009.01)
*H04L 9/32* (2006.01)
*G06F 21/33* (2013.01)
*H04W 36/00* (2009.01)
*H04W 84/12* (2009.01)

(52) U.S. Cl.
CPC ............... *H04L 63/08* (2013.01); *G06F 21/33* (2013.01); *H04L 9/3228* (2013.01); *H04L 63/0807* (2013.01); *H04W 12/06* (2013.01); *H04W 36/0038* (2013.01); *G06F 2221/2117* (2013.01); *G06F 2221/2141* (2013.01); *H04W 84/12* (2013.01)

(58) Field of Classification Search
None
See application file for complete search history.

(56) References Cited

U.S. PATENT DOCUMENTS

2005/0041808 A1* 2/2005 He .................................. 380/248
2006/0184795 A1* 8/2006 Doradla et al. ............... 713/167

* cited by examiner

*Primary Examiner* — Brandon Hoffman
(74) *Attorney, Agent, or Firm* — Great Lakes Intellectual Property, PLLC.

(57) ABSTRACT

The ability to connect a device to the Internet or another type of network from various network access points in a convenient manner is contemplated. The device may be conveniently connected to the desired network without requiring user input of a username and password when connecting to the various network access points.

20 Claims, 4 Drawing Sheets

Fig. 3

MULTIPLE ACCESS POINT ZERO SIGN-ON

CROSS-REFERENCE TO RELATED APPLICATIONS

This application is a continuation of U.S. application Ser. No. 13/423,359 filed Mar. 19, 2012, the disclosure of which is incorporated in its entirety by reference herein.

TECHNICAL FIELD

The present invention relates to facilitating connection of a device to the Internet or another type of network, such as when the device travels from a first, trusted access point to a second, untrusted or more public access point, optionally including facilitating connection through the second access point in a convenient manner with zero sign-on

BACKGROUND

Mobile devices, such as computers, phones, tablets, and the like, may be configured with capabilities to access the Internet or other networks through various access points. The mobility of such devices can be inconvenient to the user in the event a manual sign-on is required each time the device travels from one access point to another. The manual sign-on may be a cumbersome and time-consuming process where the user is obligated to input a username and password to the device as part of an authentication or other registration process required by the access point to enable connection to the Internet or other resources of the corresponding network. Accordingly, a need exists to facilitate a more convenient process where re-entry of the username and password or similar inconveniences are not necessarily required each time the device moves from one access point to another.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
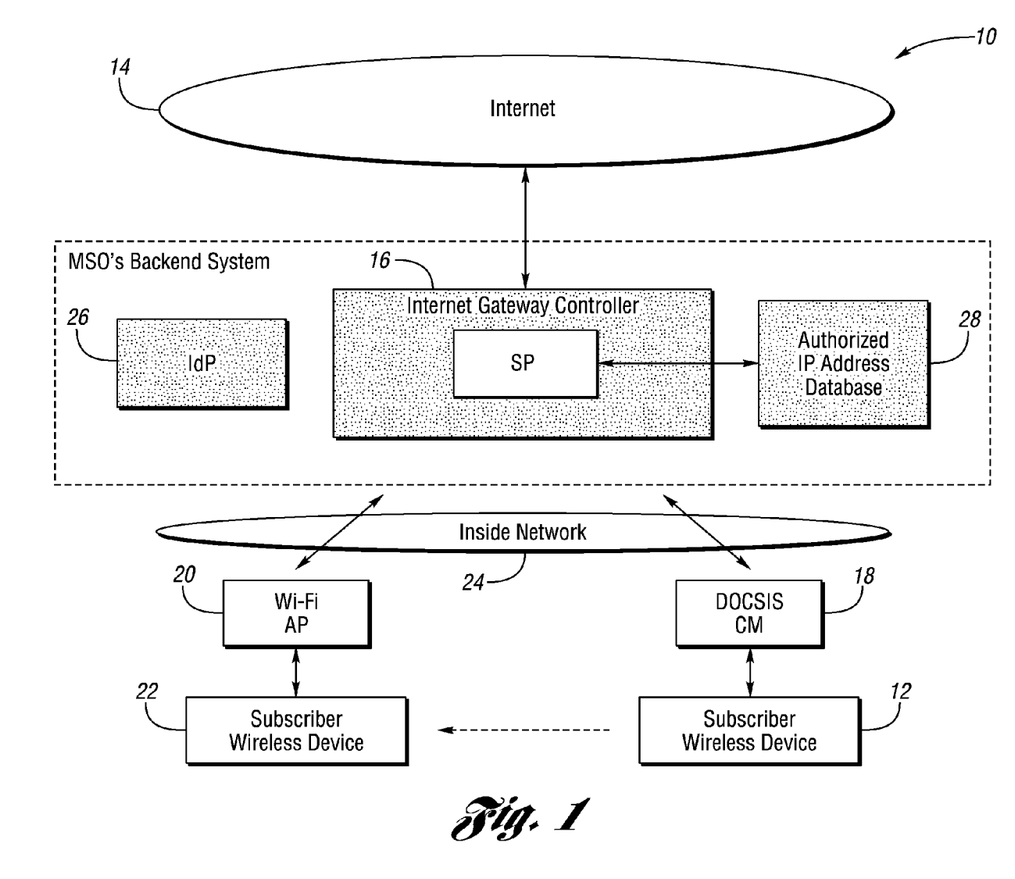
FIG. 1 illustrates a multiple access zero sign-on system as contemplated by one non-limiting aspect of the present invention.

FIG. 1 illustrates a multiple access zero sign-on system 10 as contemplated by one non-limiting aspect of the present invention. The system 10 is predominately described with respect to directing signaling between a device 12 and the Internet 14 by way of an Internet gateway controller 16 and one of a plurality of access points 18, 20. This Internet-based multiple access point configuration may be associated with an Internet service provider (ISP) or other entity, such as but not limited to a multiple system operator (MSO) or other service provider (SP) tasked with providing services to one or more user devices 12. The system 10 is contemplated to facilitate access for the device 12 when traveling from a first one of the access points 18 to a second one of the access points 20 in a manner that is convenient to the user. This may include facilitating sign-on operations at each of the access points 18, 20 in a zero sign-on manner such that the device 12 is able to connect to the Internet gateway controller 16 without requiring user input of a username and password or otherwise requiring cumbersome manual operations.

While the present invention is predominately described with respect to facilitating access to the Internet, the present invention fully contemplates the system 10 being configured to facilitate access to any type of network and not just the Internet 14. For example, the system 10 may be configured to facilitate access to proprietary services and other signaling-based facilities, such as those associated with a television service provider, a wireless or cellular telephone service provider, a voice over Internet protocol (VoIP) service provider, or other service provider relying upon high-speed data transmissions. Accordingly, it is to be understood that the following description of accessing the Internet 14 interchangeably and equally applies to accessing any one of the other contemplated networks. The services access through the Internet may relate to any type of electronic service where signaling is required, such as but not limited to streaming/transmission of television programs, telephone calls, web browsing, data/file download, and the like.

The device 12 may be any type of mobile or non-mobile device having capabilities sufficient to facilitate access to the Internet through either one of the first and second access points 18, 20. The device 12 may be a cellular or other phone, computer, laptop, tablet, personal digital assistant (PDA), set top box (STB), media terminal adapter (MTA), etc. While the description is predominately set forth with respect to a single device 12, the present invention fully contemplates its use with any number of devices 12, including simultaneously supporting access of any number of devices 12 to the Internet 14 through any number of access points 18, 20. The device 12 may include a client application embodied in a computer-readable medium having stored thereon a plurality of instructions including instructions which, when executed by a processor, cause the processor to facilitate the operations contemplated by the present invention. The client application or other feature of the device 12, for example, may be a web browser having capabilities sufficient to facilitate establishing Web-based connections to the Internet gateway controller 16 to facilitate web browsing related operations.

The first access point 18 is shown to correspond with a Data Over Cable Service Interface Specification (DOCSIS) cable modem (CM). The second access point 20 shown to correspond with a Wi-Fi access point (AP). This configuration represents one contemplated aspect of the present invention where the cable modem 18 is pre-associated with the device 12 or its user and the Wi-Fi access point is unassociated with the device 12 or its user. This configuration, for example, may coincide with the cable modem 18 being a home access point of the device 12, e.g., included at the home of a subscriber by the MSO, and the Wi-Fi access point 20 being a local wireless hotspot or more public access point. The pre-association of the cable modem 18 with the device 12 or user of the device 12 may occur when the user subscribes to the MSO for access to the Internet, such as at the time of signing-up for Internet access. During this sign-up process, the user may be required to enter or provide a username and password to be associated with their account. The MSO may then associate this username and password with the cable modem 18 deployed by a field technician for installation at the user's home.

The cable modem 18 deployed to the user's home may be assigned an IP address, a MAC address, or other suitable address by a DHCP server or other entity associated with the MSO, optionally prior to the cable modem being enabled to communicate with the MSO. (The communications with the MSO may take place over a MSO-supported inside network 24 or other private network, e.g., an inside network separately secured relative to the Internet.) Either at the time of user sign-up, during installation of the cable modem 18 at user's home, or elsewhere, the user's username and password may be associated with the address provided to the cable modem 18. The address assigned to the cable modem 18 may be fixed by the MSO or otherwise tracked by the MSO. A similar type of address may be associated with the device 12 such that at the time of sign-up or at some point thereafter the MSO may be able to generate a cross-reference or the relationship between the addresses of the device 12 and the cable modem 18 with the user (i.e., the username and password).

The relationship between the user, username and password, and device and cable modem addresses provides a certain level of trust, particularly when coupled with the secure delivery of the cable modem 18 to the user's home by a technician within the employ or trust of the MSO. When the device 12 is connected to the cable modem 18, the MSO can cross-reference the address of the device 12 with the address of the cable modem 18, and if that addresses match with those pre-associated with each other, the MSO can be relatively confident that the device 12 is authenticated for use with the cable modem 18 and that it is not some other cloned or on unauthorized device attempting to illegitimately access MSO's services. One non-limiting aspect of the present invention contemplates relying on this heightened sense of security and trust by allowing the device 12 to be provisioned with certain security capabilities based on its trusted connection through the cable modem 18, which are discussed in more detail below. The security provisioning of the device 12 when connected through the trusted (e.g. home) cable modem 18 may be relied upon to facilitate convenient access/sign-on when the device travels to the Wi-Fi access point 20.

The Wi-Fi access point 20 may lack the same level of trust as the cable modem 18, at least insofar as it may not be associated with or otherwise related to the particular user associated with the cable modem 18. The Wi-Fi access point 20, for example, may be associated with a second user/subscriber of the MSO, such as a restaurant, a neighbor, etc (the user referred to above may hereafter be interchangeably referred to as a first user). The Wi-Fi access point 20 may be associated with the second user in the same manner that the cable modem 18 is associated with a first user such that in may similarly be assigned an address and associated with a username and password of the second user and/or a second device (not shown) associated with the second user (the device 12 referred to above may hereinafter be interchangeably referred to as a first device). While the Wi-Fi access point 20 may be assigned an IP address, a MAC address, or other suitable address in a manner similar to the cable modem access point 18, this address may not be pre-associated with the first device 12 and/or the first user.

This lack of association between the Wi-Fi access point 20 and the first user and/or the first device 12 may require the MSO to verify the authenticity of the device 12 prior to allowing it to access services through the Wi-Fi access point 20. The MSO may require an authentication process or other exchange to take place through the Wi-Fi access point 20 with the device 12 prior to permitting access to the MSO services, i.e., before enabling the device to make connections with the Internet. One non-limiting aspect of the present invention contemplates facilitating this authentication process or sign-on of the device 12 so that it occurs conveniently and without unduly disrupting to the user, optionally providing a seamless transition to services when transitioning from the cable modem 18 to the Wi-Fi access point 20. The convenient multiple access point sign-on contemplated by the present invention may be characterized as a zero sign-on process where the device 12 is enabled to connect through either one of the first and second access points 18, 20 without having to input their username and password or otherwise perform a manual input operation where identifying or authenticating information is required to be input proximate in time to gaining access to the desired services.

The MSO may be comprised of a plurality of devices and networks facilitate to provide specific services to their subscribers/devices and to facilitate the illustrated connection of the device 12 to the Internet 14. While the present invention fully contemplates the MSO including cable modem termination stations (CMTSs), television or other content sourcing servers, and any other device associated with providing any other electronic service, the MSO is illustrated for exemplary non-limiting purposes as including an Internet gateway controller 16 to selectively direct signaling and other messages related to establishing Web browsing or other connections between the device 12 and the Internet 14, such as to a Web server connected to the outside of the MSO. The Internet gateway controller 16 may be a network address translator (NAT), a carrier grade network address translator (CGN), or other device having capabilities sufficient to facilitate the contemplated connections between the device 12 and the Internet 14 through the first and second access points 18, 20.

The MSO may include an identity provider (IdP) 26 configured to facilitate authenticating the device 12. The IdP 26 may be configured to facilitate various security related operations, including issuing trusted authentication session tokens and assertions as described below in more detail. The IdP 26 may be configured to issue the related certificates and keys or other security-related data sets according to the pre-association between the device 12, the addresses assigned to the device 12, the address assigned to the access points 18, 20, and the username and password associated with the user (subscriber). The MSO may include an authorized IP address database 28 or other database to facilitate storing and managing the cross-referencing or other relational association of the addresses, users, and username and password combinations. The IdP 26 may communicate with the database 28 to facilitate assessing the device 12 and/or other devices attempting to connect to either one of the illustrated first and second access points 18, 20 or other access points associated with the MSO in order to facilitate the convenient sign-on processes contemplated by the present invention.

Figure 2:
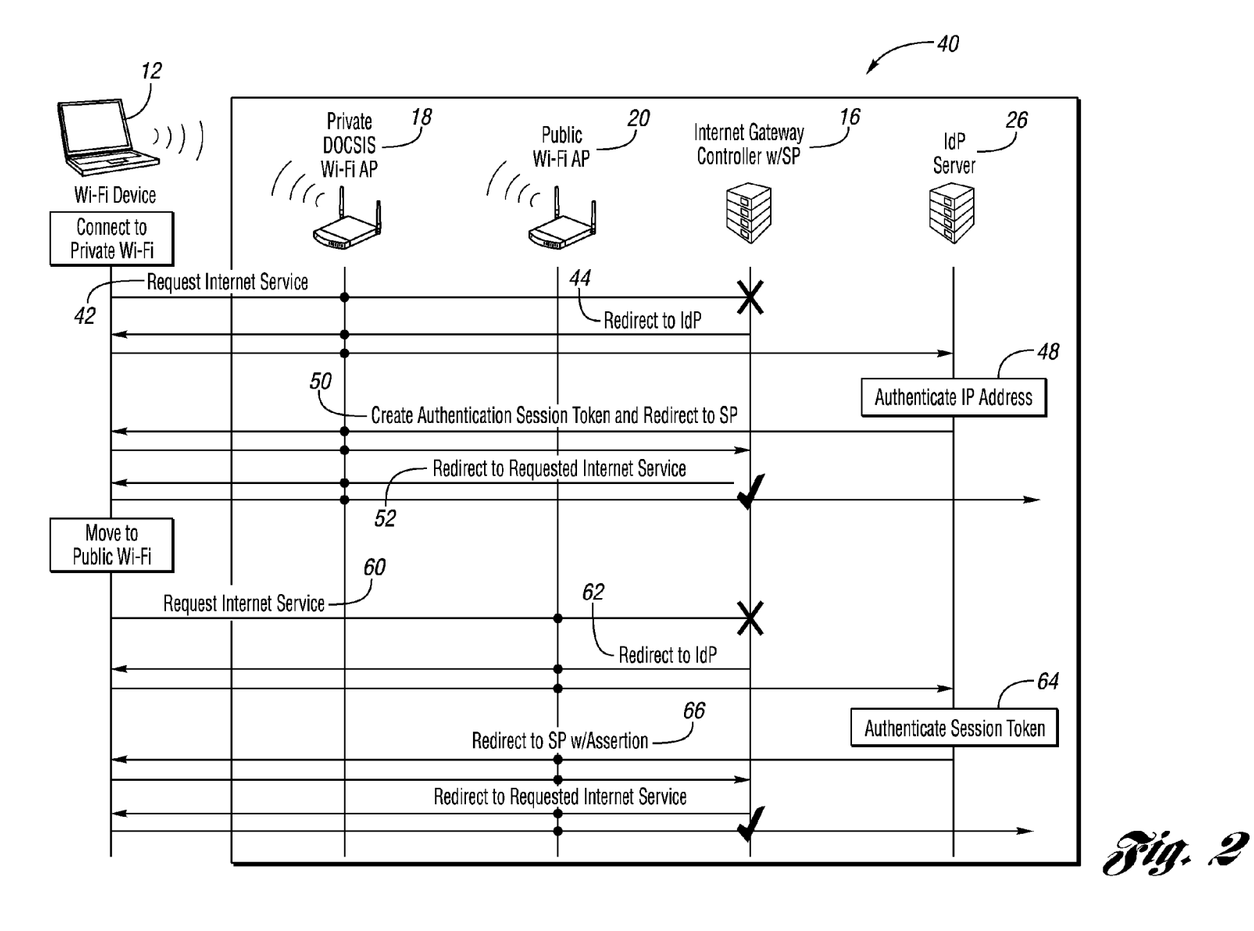
FIG. 2 illustrates a message diagram associated with facilitating multiple access point sign-on in accordance with one non-limiting aspect of the present invention.

FIG. 2 illustrates a message diagram 40 associated with facilitating multiple access point sign-on in accordance with one non-limiting aspect of the present invention. The message diagram 40 is illustrated for exemplary purposes with respect to the first device 12 being a mobile computer and the cable modem 18 being associated with or part of a router or other Wi-Fi access point. The mobile computer 12 is shown to be moving from the secured cable modem 18 to a more public Wi-Fi access point 20. The mobile computer 12 and cable modem 18 may be associated with a first user/subscriber and the Wi-Fi access point 20 may be associated with a second user/subscriber, such as in the manner described above. Once so associated, the mobile computer 12 may attempt to connect to the Internet through the first access point 18 with issuance of a request Internet service message 42. The request Internet service message 42, for example, may be one associated with a web browser of the mobile computer 12 attempting to establish a connection with a Web server connected to the Internet 14. The Internet gateway controller 16 may initially receive the request Internet service message in order to direct a message 42 to the appropriate Web server.

The Internet gateway controller 16 may temporarily prevent directing the message to the desired Web server in order to authenticate or perform other security-related analysis of the mobile computer 12. The Internet gateway controller 16 may require an authentication session token from the mobile device before directing the request Internet service message 42 to the Web server other intended recipient on the Internet. In the event the mobile computer 12 has already been provisioned with the desired authentication session token, the Internet controller 26 may automatically direct the request Internet service message 42 without further delay to the desired Web server. The illustration of FIG. 2 presumes the desired authentication session token has not been provisioned such that the mobile device 12 must be so provisioned. One non-limiting aspect of the present invention contemplates provisioning the mobile computer 12 with the authentication session token in a convenient manner. This may include provisioning the mobile computer 12 with the authentication session token in a zero sign-on operations where the user is not required to input username and password or other manual inputs to the mobile computer at the time of provisioning.

The Internet gateway controller 26 may issue a redirect to IdP message 44 to the device 12 through the first access point 18 in the event the authentication session token is not detected at the time of requesting Internet service. The redirect to IdP message 44 may prompt the mobile computer 12 or an application operating on the mobile computer 12 to request authentication through the IdP server 26. The IdP server 26 may instigate an authentication IP address process 48 to authorize provisioning of the authentication session token, which may be automatically given to any device connecting to the trusted cable modem 10. Optionally, the IP addresses associated with the mobile computer 12 and/or the first access point 18 or other address associated therewith may be compared to determine whether the address of the mobile computer 12 match with the address pre-assigned to the first access point 18 before provisioning. In the event the addresses are verified, the IdP server 26 may provide the authentication session token within a redirect to requested Internet service message 50. Once the authentication session token is received by the mobile computer 12, the mobile computer 12 may then re-issue the request Internet service message or other suitable message 52 to the Internet gateway controller to request connection/direction to the Internet.

In this manner, the mobile computer 12 may be provisioned with the authentication session token in a zero sign-on manner such that the mobile device 12 may be able to continue communications through the first access point with the Internet, optionally without having to recertify itself and without having to input username and password or to perform other manual authentication processes. Optionally, the IdP 26 and/or the Internet gateway controller 16 may assign a timer or other limit to the authentication session token in order to limit an amount of time during which the authentication session token can be used or authorized by the Internet gateway controller 16 to facilitate Internet communications. After being provisioned with the authentication session token, i.e., at some point after the mobile computer 12 has successfully connected through the first access point 18, the mobile computer 12 may be enabled to connect through the second access point 20 in the convenient manner contemplated by the present invention. As described below in more detail, the connection through the second access point 20 may occur with completion of a similar zero sign-on operation.

The mobile computer 12 may be configured to issue another request Internet service message 60 when connected at the second access point 20 in order to request access to the Internet. Since the request Internet service message 60 is being communicated through the second access point 20 (e.g., the public Wi-Fi access point), it will be associated with the second address of the second access point 20. Even though the mobile computer 12 is now provisioned with the authentication session token, the Internet gateway controller 16 may be prohibited from directing the request Internet service message to the Internet. The Internet gateway controller 16 may be configured to keep track of the first address of the first access point 20 associated with the trusted authentication session token to determine its use at the new location. The Internet gateway controller 16 may require the entity through which the authentication session token is communicated to be the first access point 18 or other access point pre-assigned/associated with the mobile device before permitting connection to the Internet. In order to facilitate desired zero sign-on operation at the second access point 20, the Internet gateway controller 16 may issue a redirect IdP message 62 to the mobile computer 12. The redirect IdP message 62 may be used to instruct the mobile computer 12 to contact the IdP server 26 for an assertion.

The IdP server 26 may be configured to issue the assertion in the event the authentication session token provisioned to the mobile computer is verified. The IdP server 26 may complete an authentication session token process 64 to verify the authentication session token prior to issuing the assertion. The verification of the authentication session token may include checking that the communicated authentication session token has not expired. The verification process may optionally require the communicated authentication session token to indicate it was sent from the mobile device 12 to which it was previously assigned by the IdP server 26. This may be accomplished by the IdP server 26 verifying the message requesting the assertion was communicated from the address previously assigned to the device 12 when communicating through the first access point 18, e.g., by assessing a source address of the related messaging (which will be different that the first address assigned to the first access point 18). Of course, the IdP server 26 may perform any number of other assessments of verifications of the communicated authentication session token or other parameters of the messaging the mediated through the second access point 20 by the device 12.

In the event the authentication session token process determines the communicated authentication session token to be verified, the IdP server 26 may communicate the assertion within a redirect to Internet gateway controller message 66. The assertion may be used to indicate the IdP's trust in the mobile device 12 as being a mobile device within the service domain of the Internet gateway controller 16 even though the mobile device 12 is not at the secure and trusted first access point 18. The mobile computer 12 may recover the assertion and provide it to the Internet gateway controller to initiate connection to the Internet. The Internet gateway controller 16 may assess the assertion such that the mobile device 12 is connected through the second access point to the Internet in a zero sign-on manner. This ability to connect to the Internet without input of username and password or other manual input is believed to be beneficial in providing a convenient means for connecting to the Internet at multiple access points 18, 20. The messages exchanged to communicate the authentication session token and the assertion may occur relatively quickly and without any disruption or notice by the user of the mobile computer 12.

In the event the authentication session token has expired or the authentication session token process otherwise fails to verify the mobile device 12, Internet access may nonetheless be granted in the event the proper username and password is received. This may occur, for example, as part of the manual sign-on process where a user of the mobile computer 12 is requested to input a username and password for comparison to the username and password associated with the first access point 18 and the trusted authentication session token provided therethrough. Access to the Internet can be granted if the username and password inputted at the time of sign-on at the second access point 20 match with the username and password pre-associated with the device 12. This type of manual sign-on operation may not be preferable as it may be an inconvenience to the user when relying on the device 12 to transition access from the first access point 18 to second access point 20. The ability to facilitate a manual sign-on in this manner, however, may be beneficial in insuring the user is able gain access when the authentication session and/or assertion are invalid or unverified.

Figure 3:
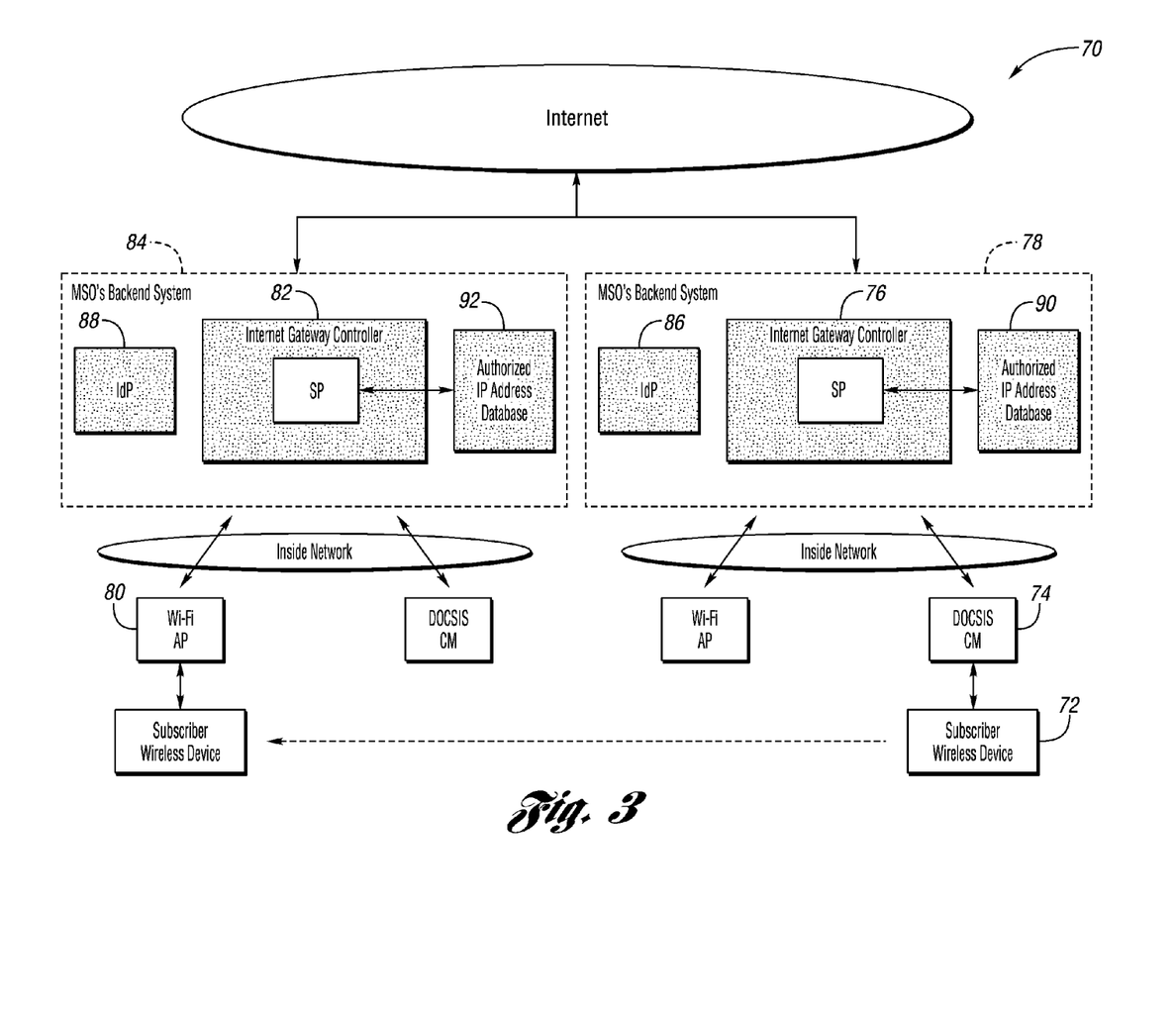
FIG. 3 illustrates a multiple access zero sign-on system for roaming in accordance with one non-limiting aspect of the present invention.

The foregoing describes a zero sign-on process where the first and second access points 18, 20 rely upon the same Internet gateway controller 16 to direct signaling with the Internet 14. This type of arrangement may be used within a corresponding geographical area or other grouping of the MSO. FIG. 3 illustrates a multiple access zero sign-on system 70 for supporting zero sign-on access when a device 72 travels to a location outside one MSO's system to another in accordance with one non-limiting aspect of the present invention. This scenario may coincide with a roaming of the device 72 such that a first access point 74 is associated with a first Internet gateway controller 76 of a first MSO 78 and a second access point 80 is associated with a second Internet gateway controller 82 of a second MSO 84. Of course, the present invention is not necessary limited to the first and second Internet Gateway controllers 78, 84 being associated with different MSO's and fully contemplates a similar scenario occurring where the first and second Internet giving controllers 78, 84 are within the domain of the same MSO but still required to operate independently. The independent nature of the first and second Internet gateway controllers 78, 84 may require corresponding IdPs 86, 88 and authorized IP address databases 90, 92 such that the system 72, which operate in a manner similar to that described above with respect FIG. 1.

Figure 4:
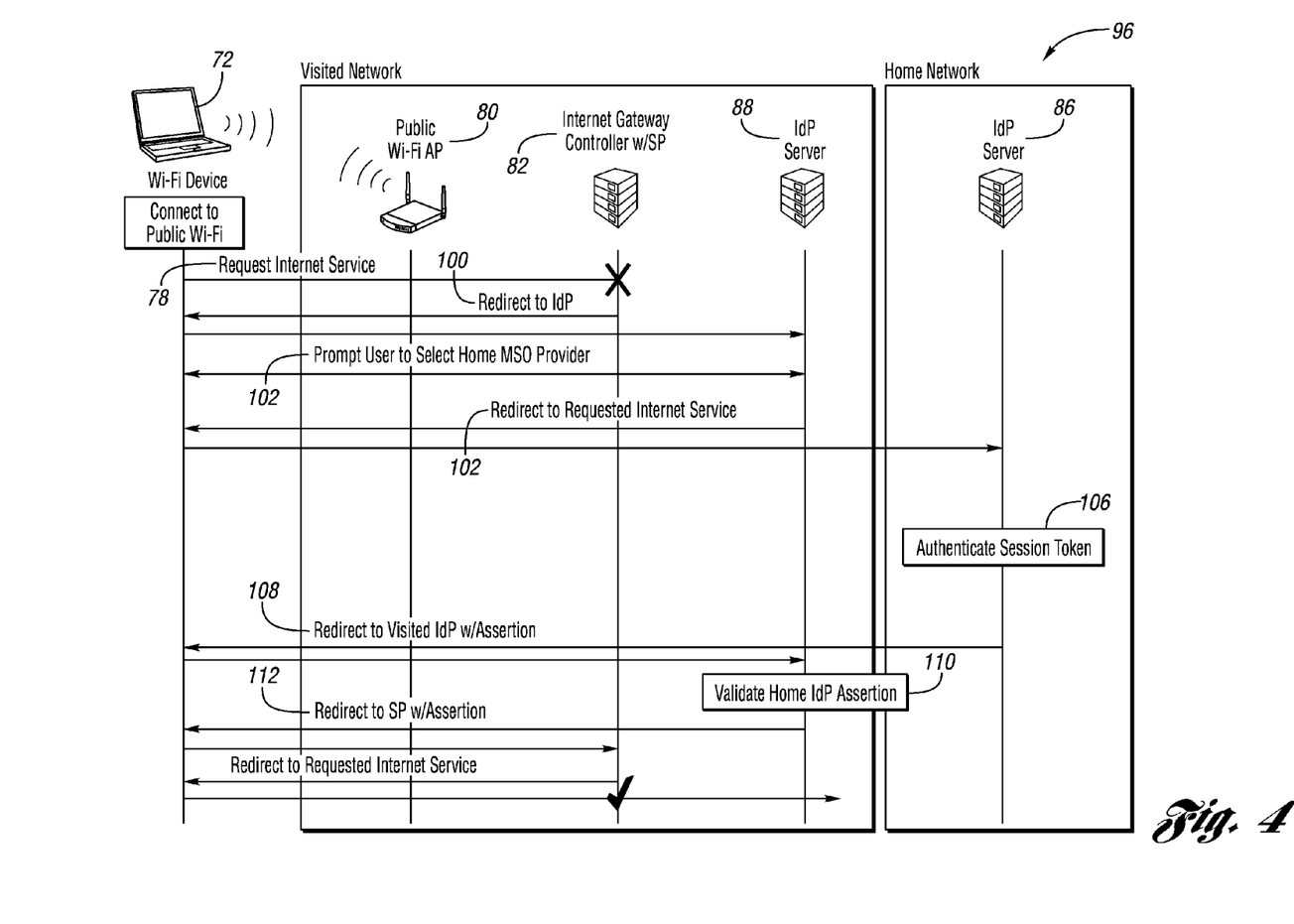
FIG. 4 illustrates a message diagram associated with facilitating multiple access point sign-on when roaming in accordance with one non-limiting aspect of the present invention.

FIG. 4 illustrates a message diagram 96 associated with facilitating multiple access point sign-on when the device 72 is roaming in accordance with one non-limiting aspect of the present invention. The messaging diagram illustrates the mobile device 72 as connected to the second access point 80 after being provisioned with the authentication session token through the first access point 74 in the manner described above with respect to FIG. 2. The mobile device 72 may issue a request Internet service message 98 through the second access point 80 to be received at the second Internet gateway controller 82. The second Internet gateway controller 82 may assess the address of the requested Internet service message 98 to determine the need for the mobile device 72 to obtain an assertion before permitting Internet connection. The second Internet gateway controller 82 may issue a redirect to IdP message 100 to instruct the mobile device 72 to connect to the second IdP server 88. The second IdP 88 server may be unaware of the mobile device 72, the first access point 74, and/or the trusted authentication session token provided through the first access point 74. The second IdP 88 may respond to the mobile device 72 with a prompt for the user to select a home MSO provider message 102 to identify the first MSO 78 associated with the mobile device 72, the first access point 74, and/or the provisioned authentication session token.

Once the user-selected MSO 78 is determined, the second IdP server 88 may issue a redirect home MSO IdP message 104 to the mobile device 72. The mobile device 72 may use messaging or other information included within this message 104 to contact the first IdP server 86. The first IdP server 86 may perform an authentication session token operation 106 in the manner described above in FIG. 2 to verify the mobile device 72. The first IdP server 86 may respond with a redirect to visited IdP with assertion message 108 in the event the trusted authentication session token is verified as part of the authentication session token operation 106. The assertion provided within the redirect to visited IdP with assertion message 108 may be used by the second IdP server 88 to conduct a validate home IdP assertion operation 110. This operation 110 may be used by the second IdP server 88 to determine whether Internet connection should be granted to the mobile device 72 through the second access point 80. The validate home IdP assertion process 110 may generally relate to the second IdP server 88 verifying whether the first IdP server 86 trusts the mobile device 72.

In the event trust of the mobile device 72 is determined, a redirect to requested Internet service message 112 may be provided to the second Internet gateway controller 82 from the mobile device 72 to facilitate connecting through the second access point 80 to the Internet. This process of facility connection of the mobile device 72 through the second access point 80 to the Internet may be conducted in a zero sign-on manner such that the user thereof is not required to input using a password or to perform significant manual operations other than identifying its home MSO. While this process may require some manual operation, it does not require the user to input a username and password and therefore is believed to be a more convenient process than requiring the user to input a username and password. Optionally, in the event one of the assertion should fail or the zero sign-on process fails to complete, the user may be prompted to input a username and password to gain access to the Internet.

An MSO's security infrastructure along with SAML messaging can be used in accordance with the present invention to provide a zero sign-on (ZSO) experience for subscriber Wi-Fi network access. The architecture may consists of the following main components: DOCSIS access network; SAML Identity Provider (IdP); Internet Gateway controller (IGC) with SAML Service Provider (SP); Authorized IP address database; Wi-Fi access network; and User device w/web browser. The DOCSIS security infrastructure can be used by MSOs to issue security tokens to subscribers which will enable them to automatically connect and authenticate to MSO Wi-Fi access points. This provides a zero-sign on experience where the subscriber does not have to enter credentials (e.g. username/password) for authentication. Cable operators and other service providers may find the present invention valuable to enable subscribers to connect to Wi-Fi access points without having to enter their username/password credentials. This invention provides a desirable subscriber experience since they do not have to keep track of and enter another set of credentials for Wi-Fi access.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating zero sign-on access to a service for a device that travels from a first access point to a second access point, the first access point having recently authenticated the device following completion of a first access point sign-on operation, the second access point facilitating communications with a server configured to provide the service net, the server requiring an assertion to permit the device to access the service through the second access point, an identity provider (IdP) being configured to provide a trusted authentication session token and the assertion to the device through one or both of the first and second access points, the method comprising:

provisioning the device with the trusted authentication session token following the IdP verifying a username and password entered at and transmitted from the first device as part of the first access point sign-on operation; and conducting a second access point sign-on operation sufficient for providing the device access to the service through the second access point, the second access point sign-on operation being completed with zero sign-on such that the username and password associated with the trusted authentication session token is not entered with the device through the second access point, the second access point sign-on operation including:

i) the device transmitting the trusted authentication session token to the IdP through the second access point;

ii) the IdP verifying the trusted authentication session token, and if verified, providing the assertion to the device through the second access point;

iii) the device transmitting the assertion through the second access point to the server; and iv) the server connecting the device to the service upon receipt and verification of the assertion following transport through the second access point.

2. The method of claim 1 further comprising verifying a first address used by the device to communicate through the first access point is trusted before engaging the IdP to verify the username and password.

3. The method of claim 2 further comprising the IdP determining the first address to be trusted in the event the first address is within a trusted address range.

4. The method of claim 2 further comprising completing the second access point sign-on with manual sign-on in the event the IdP fails to verify the trusted authentication session token due to a message requesting the assertion failing to properly identify the first address, the manual sign-on requiring input of the username and password with the device through the second access point.

5. The method of claim 1 further comprising the IdP requiring an authorized timer associated with the trusted authentication session token to be unexpired in order to verify the trusted authentication session token.

6. The method of claim 5 further comprising the IdP setting an assertion timer for the assertion, the assertion time specifying a time period during which the device is enabled to access the service through the second access point without requiring further receipt of the assertion, the device being required to again provide the assertion through the second access point to the server upon expiration of the assertion timer in order to access the service.

7. A system for providing an assertion of identify for a device attempting to access a service from a server, the server granting or denying the device access to the service depending on whether the assertion is verified or unverified, the system comprising:

an identity provider (IdP) configured to authenticate the device, the IdP being configured to provide a trusted authentication session token and an assertion to the device;

a first access point configured to provide connections between the device and the IdP, the first access point assigning a first IP address to the device when connected thereto;

a second access point configured to provide connections between the device and the server, the second access point assigning a second IP address to the device when connected thereto;

wherein the IdP is configured to provide the trusted authentication session token to the device when connected to the first access point if the first IP address matches with a trusted IP address, wherein the IdP prevents the trusted authentication session token from being provided to the device when connected to the second access point such that the device must connect through the first access point at least once in order to receive the trusted authentication session token from the IdP; and wherein the IdP is configured to facilitate providing the assertion to the server while the device is connected to the second access point if the trusted authentication session token is still valid when received at the IdP after being transmitted thereto through the second access point, the server thereafter processing the received assertion to determine whether to grant or deny the device access to the service through the second access point.

8. The system of claim 7 wherein the IdP is configured to set an assertion timer for the assertion, the server requiring the assertion to be valid prior to granting the device access to the service through the second access point, the server determining the assertion to be valid in the event the assertion timer is unexpired.

9. The system of claim 7 wherein the server is configured to grant the device access to the service through the second access point with zero sign-on in the event the assertion is valid when received, the zero sign-on providing the device access to the service without having to input the username and password to the device when connected to the second access point.

10. The system of claim 9 wherein the server is configured to grant the device access to the service through the second access point with manual sign-on in the event the assertion is invalid when received, the manual sign-on requiring an input of the username and password to the device when connected to the second access point.

11. The system of claim 9 wherein the IdP is configured to require the device to perform the manual sign-on when connected to the first access point before providing the trusted authentication session token therethrough.

12. The system of claim 7 wherein the IdP is configured to provide the assertion to the server via a redirect message transmitted to the device while connected to the second access point, the redirect message including the assertion and being sufficient for instructing the device to automatically transmit the assertion to the server upon receipt.

13. The system of claims 12 wherein:
the IdP is configured to transmit the trusted authentication session token to the device within a first message having a destination address matching the first IP address; and
the IdP is configured to transmit the redirect message in response to a second message transmitted from the device through the second access point, the second message requesting the assertion and including a source address corresponding with the second IP address.

14. The system of claim 13 wherein:
the IdP is configured to associate the trusted authentication session token with at least one of the first IP address and a device address assigned to the device;
the second message includes data sufficient for identifying at least one of the first IP address and the device address; and
the IdP verifies the at least one of the first IP address and the device address identified in the second message and transmits the redirect message to the device if verified and prevents transmit of the redirect message to the device if unverified.

15. A non-transitory computer-readable medium having a plurality of non-transitory instructions operable with an identity provider (IdP) to facilitate providing an assertion for confirming an identify associated with a device attempting to access a service from a server, the server granting or denying the device access to the service depending on whether the assertion is verified or unverified when received, the non-transitory instructions being sufficient for:
provisioning the device with a trusted authentication session token while connected to a first access point after determining the first access point to be trusted, the trusted authentication session token representing the identity associated with the device;
authenticating the device while connected to a second access point different from the first access point as a function an authentication message transmitted therethrough, the authentication message including the trusted authentication session token; and
generating the assertion to confirm the identity associated with the device while the device is connected to the second access point after determining the second access point to be untrusted if the trusted authentication session token included with the authentication message is valid when received.

16. The non-transitory computer-readable medium of claim 15 further comprising non-transitory instructions sufficient for providing the assertion to the server via a redirect message transmitted to the device while connected to the second access point, the redirect message including the assertion and being sufficient for instructing the device to automatically transmit the assertion to the server upon receipt.

17. The non-transitory computer-readable medium of claim 16 further comprising non-transitory instructions sufficient for:
verifying a username and password combination input to the device as at least part of a sign-on operation performed while connected to the first access point and prior to provisioning the device with the trusted authentication session token;
transmitting the redirect message to the device through the second access point without requiring the device to perform the sign-on operation or otherwise input the username and password combination for purposes of accessing the service while connected to the second access point, thereby enabling zero sign-on access to the service.

18. The non-transitory computer-readable medium of claim 15 further comprising non-transitory instructions sufficient for transmitting the assertion directly to the server while the device is connected to the second access point.

19. The non-transitory computer-readable medium of claim 15 further comprising non-transitory instructions sufficient for determining the first access point to be trusted in the event a source address included within a provisioning message used to trigger provisioning the device with the trusted authentication session token while connected to the first access point is within a trusted address range.

20. The non-transitory computer-readable medium of claim 19 further comprising non-transitory instructions sufficient for:
provisioning the device with the trusted authentication session token while connected to the first access point if the first access point is untrusted upon verifying user input of a username and password combination to the device while connected to the first access point; and
facilitating transmission of the assertion to the server while the device is connected to the second access point either via a direct transmission to the sever or via a redirect message transmitted to the device while connected to the second access point, the redirect message including the assertion and being sufficient for instructing the device to automatically transmit the assertion to the server upon receipt, including facilitating transmission of the assertion to the server without requiring user input of the username and password combination while the device is connected to the second access point.

* * * * *